United States Patent Office 3,268,763
Patented August 23, 1966

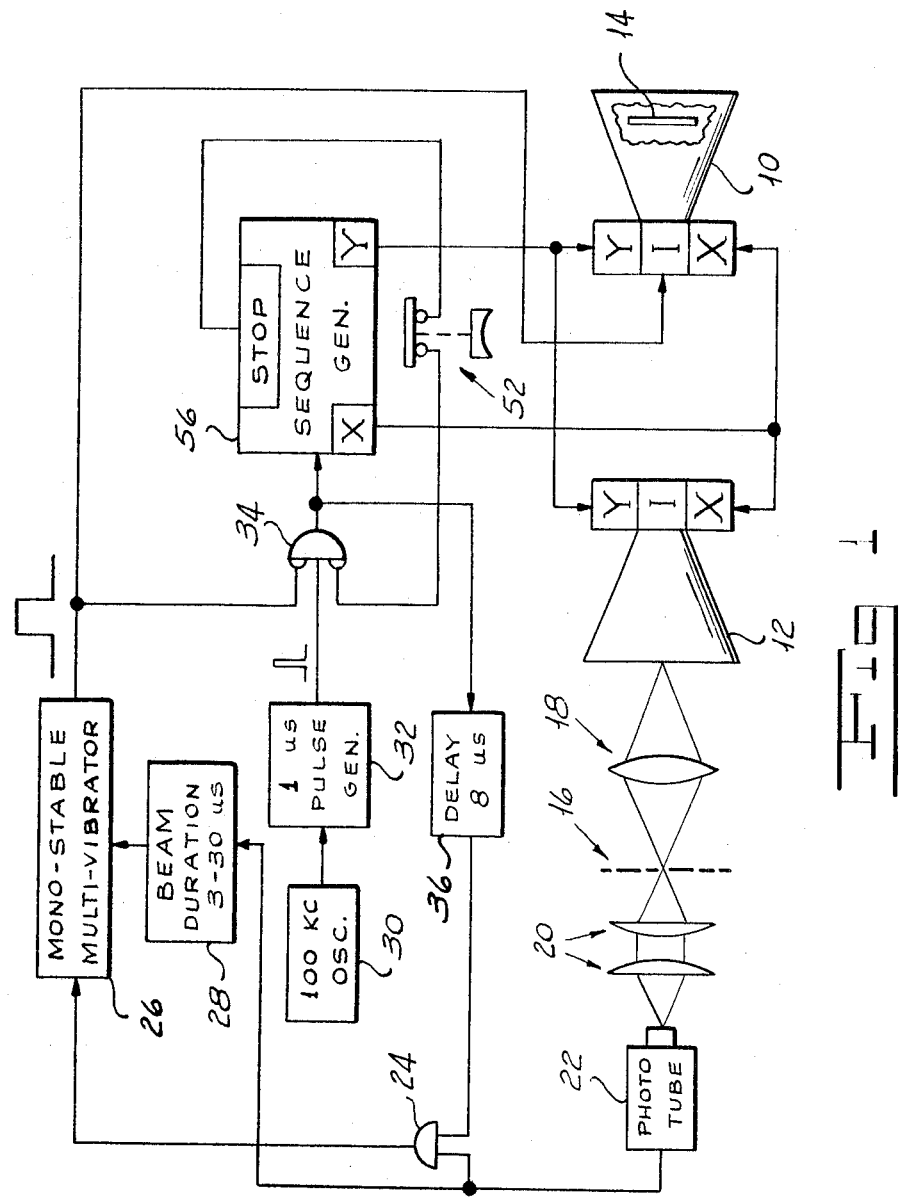

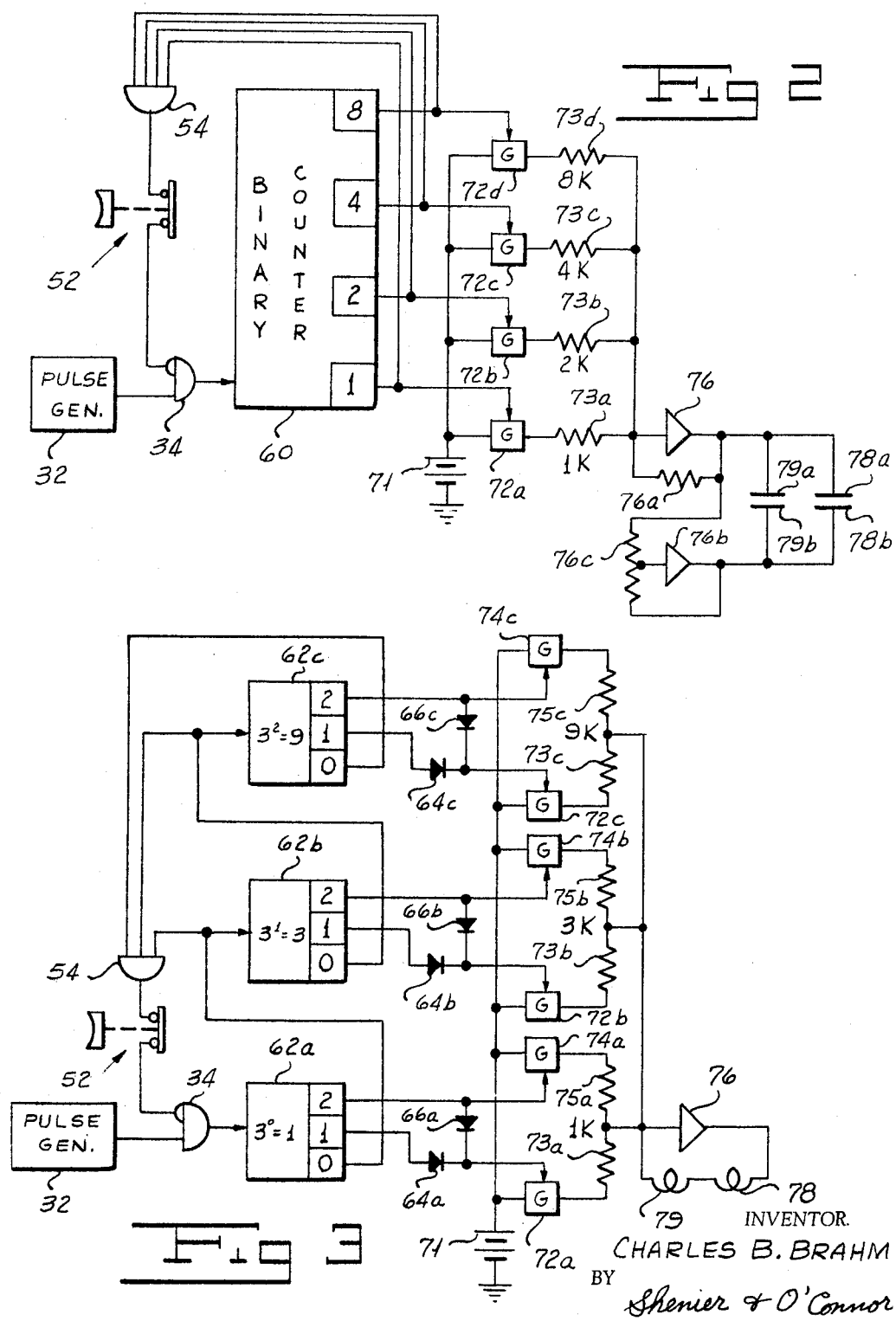

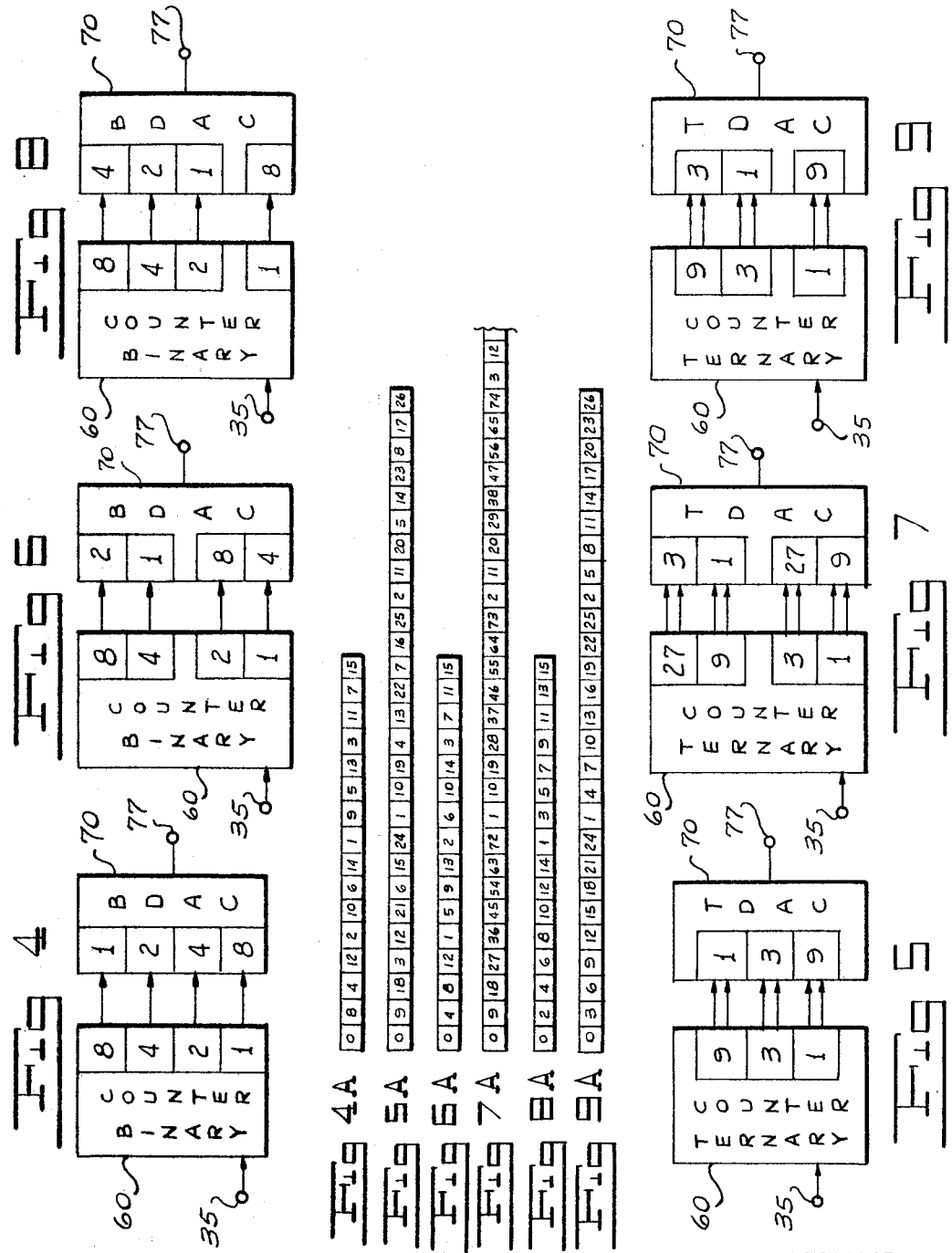

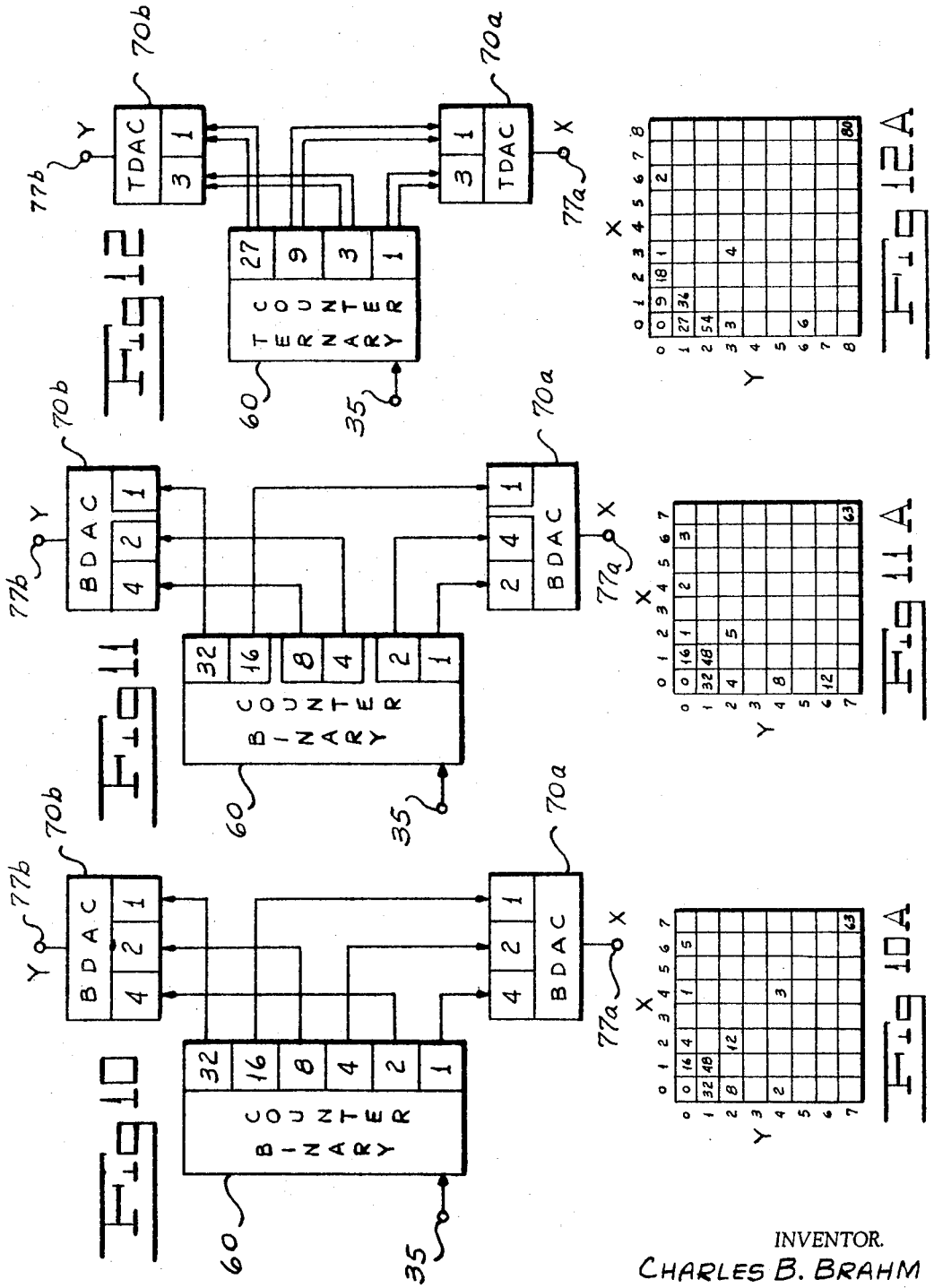

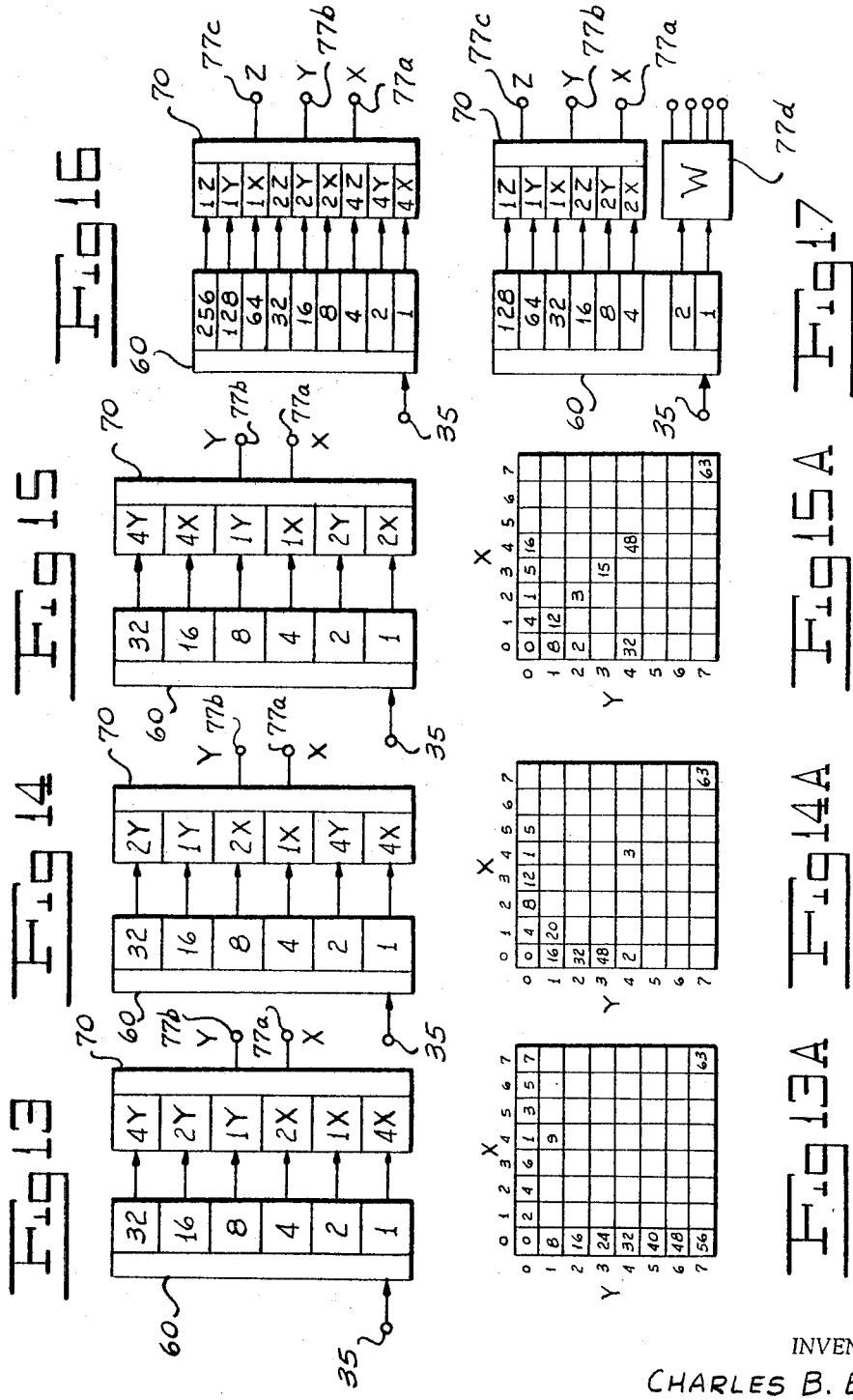

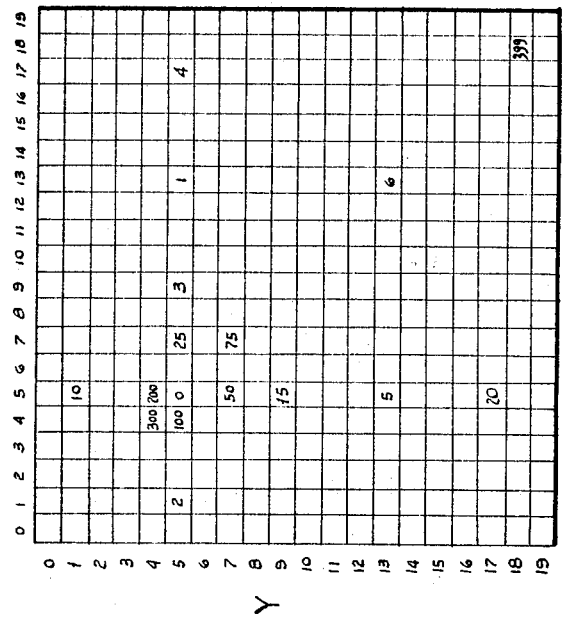

3,268,763
SPACE-TIME SEQUENCE GENERATOR FOR
ELECTRON BEAM MACHINING
Charles B. Brahm, Ellington, Conn., assignor to United
Aircraft Corporation, East Hartford, Conn., a corporation of Delaware
Filed June 20, 1962, Ser. No. 203,940
24 Claims. (Cl. 315—9)

My invention relates to a space-time sequence generator and more particularly to a device for generating a sequence having the greatest minimum product of space separation and time separation.

My invention is particularly applicable in electron beam machining. In the vaporization of material by an electron beam, the intense heat produced in one localized area must be permitted to dissipate before an adjacent localized area can be drilled to prevent melting and secure sharply defined machining. Two points adjacent in space should not be drilled adjacently or successively in time. Furthermore, there is the consideration that the heating of the entire workpiece should be kept uniform to avoid local distortion due to uneven heating.

I have solved the problem of performing a large number of operations in some N-dimensional space in the shortest possible period of time while minimizing the adverse effect of one operation upon subsequent operations. By N-dimensional space is meant a 1-dimensional space such as a length, a 2-dimensional space such as an area, a 3-dimensional space such as a volume where all dimensions are significant and none are degenerate, or a 4-dimensional space such as a plurality of discrete volumes. Furthermore, a 2-dimensional space may comprise a plurality of discrete lengths; and a 3-dimensional space may comprise a plurality of discrete areas.

One object of my invention is to provide a space-time sequence generator having the greatest minimum product of space separation and time separation.

Another object of my invention is to provide a space-time sequence generator having a space separation-time separation product at least equal to 2 so that points adjacent in space are not adjacent in time and points adjacent in time are not adjacent in space.

A further object of my invention is to provide a space-time sequence generator which treats of the space to be operated upon as an entity to reduce the localized effects of a plurality of operations.

A still further object of my invention is to provide a novel method of electron beam machining.

Other and further objects of my invention will appear from the following description:

In general my invention contemplates the provision of a counter having at least two digit outputs. These digit outputs need not be in the same number system but may be in different number systems. By triggering the counter with successive pulses I generate a time sequence. I further provide a digital-to-analogue converter having at least two digit inputs. The number systems of converter digit inputs should correspond with those of the counter digit outputs. Furthermore, the least significant digit output of the counter should have the same number system as the most significant digit input of the converter; and the most significant digit output of the counter should have the same number system as the least significant digit input of the converter. By coupling the digit outputs of the counter to those digit inputs of the converter having corresponding number systems rather than corresponding places of significance, I may produce a sequence having a large product of space separation and time separation.

In the accompanying drawings which form part of the instant specification and which are to be read in conjunction therewith, and in which like reference numerals are used to indicate like parts in the various views:

FIGURE 1 is a schematic view of an electron beam machining system in which the sequence generator is indicated only generally;

FIGURE 2 is a schematic view of a 1-dimensional binary sequence generator;

FIGURE 3 is a schematic view of a 1-dimensional ternary sequence generator;

FIGURE 4 is a diagrammatic view of the 1-dimensional binary sequence generator of FIGURE 2;

FIGURE 5 is a diagrammatic view of the 1-dimensional ternary sequence generator of FIGURE 3;

FIGURE 6 is a diagrammatic view of a 1-dimensional quaternary sequence generator;

FIGURE 7 is a diagrammatic view of a 1-dimensional nonary sequence generator;

FIGURE 8 is a diagrammatic view of a minimal 1-dimensional binary sequence generator;

FIGURE 9 is a diagrammatic view of a minimal 1-dimensional ternary sequence generator;

FIGURES 4A through 9A show the various 1-dimensional sequences provided by the generators of FIGURES 4 through 9, respectively;

FIGURE 10 is a diagrammatic view of a 2-dimensional binary sequence generator;

FIGURE 11 is a diagrammatic view of a 2-dimensional quaternary sequence generator;

FIGURE 12 is a diagrammatic view of a 2-dimensional ternary sequence generator;

FIGURES 10A through 12A show the various 2-dimensional sequences provided by the generators of FIGURES 10 through 12, respectively;

FIGURE 13 is a diagrammatic view of a 2-dimensional binary sequence generator which treats an entire area on a line-by-line basis;

FIGURE 14 is a diagrammatic view of a 2-dimensional binary sequence generator which provides line-by-line treatment of sub-areas;

FIGURE 15 is a diagrammatic view of a 2-dimensional binary sequence generator which provides sub-area treatment of an entire area;

FIGURES 13A through 15A show the various 2-dimensional sequences provided by the generators of FIGURES 13 through 15, respectively;

FIGURE 16 is a diagrammatic view showing a 3-dimensional sequence generator;

FIGURE 17 is a diagrammatic view showing a 4-dimensional sequence generator for treating a plurality of discrete volumes;

FIGURE 18 is a diagrammatic view of a 1-dimensional binary sequence generator having one digit of reversed order;

FIGURE 19 is a diagrammatic view of a minimal 1-dimensional binary sequence generator having one digit of reversed order which provides fractional line treatment;

FIGURES 18A and 19A show the various 1-dimensional sequences provided by the generators of FIGURES 18 and 19, respectively;

FIGURE 20 is a diagrammatic view of a quintary-binary 2-dimensional sequence generator having mixed order quintary digits and reversed order binary digits;

FIGURE 20A shows the 2-dimensional sequence provided by the generator of FIGURE 20.

Referring now more particularly to FIGURE 1 of the drawings, I provide an electron beam machining tube 10 and a cathode ray tube 12. A workpiece 14, the 2-dimensional surface area of which is to be machined, is placed within the evacuated space of tube 10. Tubes 10 and 12 are provided with X axis and Y axis deflection inputs and with an intensity input. The intensity input of tube 12 should be such as to cause an illuminated spot to appear on the face of the tube. The spot on the face of tube 12 is focused by objective lens 18 into a real image which appears in the plane of a template or photographic negative 16 having various opaque and transparent areas. The spot image in the plane of template 16 is focused by a condenser assembly, comprising a pair of spaced planar-convex lenses 20, onto the surface of a phototube 22. The output of a 100-kilocycle oscillator 30 drives a generator 32 which provides pulses conveniently of one microsecond duration. The output of pulse generator 32 is coupled to one input of an AND circuit 34. The output of AND circuit 34 drives sequence generator 50 and is coupled to a delay network 36 which conveniently provides a time delay of eight microseconds. The outputs of delay network 36 and phototube 22 are coupled to an AND circuit 24. The output of AND circuit 24 triggers a monostable multivibrator 26. Multivibrator 26 provides output pulses variable between three and thirty microseconds in accordance with the setting of a beam duration input 28. The output of multivibrator 26 is coupled to the intensity input of the electron beam machining tube 10 and is further coupled to an inhibiting input of AND circuit 34. Sequence generator 50 provides X and Y analogue outputs which are coupled respectively to the X and Y deflection circuits of tubes 10 and 12. Sequence generator 50 further provides a stop signal, indicating completion of work, which is coupled through a normally closed, manually operable, switch 52 to an inhibiting input of AND circuit 34.

In operation of the circuit of FIGURE 1, assume that a stop signal is present from sequence generator 50 which prevents AND circuit 34 from responding to the train of 100-kilocycle pulses of one microsecond duration from generator 32. By manually opening switch 52, the machining operation is commenced. The opening of switch 52 removes the inhibiting stop signal from AND circuit 34, which permits a pulse from generator 32 to be coupled to the sequence generator 50, indexing it one count. Thereupon the stop output of generator 50 is removed, so that subsequent closure of switch 52 cannot disturb the cycle of operation. The X and Y outputs of generator 50 simultaneously index the deflection circuits of tube 10 and the spot of tube 12. If the spot image in the plane of template 16 falls upon a transparent area of the template 16, phototube 22 provides an output, which enables AND circuit 24. The same pulse from AND circuit 34 which indexes generator 50 is also coupled eight microseconds subsequently through AND circuit 24 to trigger multivibrator 26. The output of multivibrator 26 actuates the intensity input of tube 10 so that an electron beam now impinges upon workpiece 14 to drill a hole therethrough or to vaporize at least a portion of the surface material of the workpiece. The output of multivibrator 26 simultaneously disables AND circuit 34 from responding to pulses from generator 32 during the electron beam machining period. After a variable delay provided by circuit 28, multivibrator 26 reverts to its normal state, turning off the electron beam of tube 10 and enabling AND circuit 34 to respond to further pulses from generator 32. Subsequent outputs from AND circuit 34 cause the sequence generator 50 to index to further counts thereby actuating the deflection circuits of tube 10 and moving the spot of tube 12 to different positions so that the spot image falls on different portions of template 16. If the spot image falls upon an opaque portion of template 16, then phototube 22 provides no output and the delayed indexing pulse from network 36 does not pass through AND circuit 24 to trigger multivibrator 26. Thus the intensity input of tube 10 is not actuated where the spot image falls on an opaque portion of template 16.

The normal spacing between the 100-kilocycle pulses from generator 32 is ten microseconds. The time delay of network 36 should be large compared with this ten microsecond period in order to give the deflection circuits of tubes 10 and 12 ample time within which to achieve a steady state condition. It will be appreciated that if the image of the spot has not achieved its steady state position, phototube 22 may provide an erroneous output and trigger multivibrator 26 to cause drilling of the workpiece 14, even though the template 16 is opaque in the steady state spot image position. If the desired accuracy of beam positioning is three parts out of ten thousand (.0003) then the combined time-constant of the X and Y analogue outputs of generator 50 and of the X and Y deflection circuits of tubes 10 and 12 must be one microsecond. Then the time delay provided by circuit 36 will be eight times the time constant of the beam positioning system. This will yield an accuracy of $e^{-8}=.00033$ as desired. This means that the deflection system should have a cut-off frequency which is not less than 160 kilocycles per second. When the sequence generator 50 has completed its cycle of operation it produces a stop signal which disables AND circuit 34. Conveniently the stop signal may actuate a visual or oral device to indicate the completion of work.

Referring now to FIGURE 2, I have shown a simplified 1-dimensional form of sequence generator 50. AND circuit 34 is again driven by pulse generator 32. The stop signal from an AND circuit 54 is again coupled through a normally closed, manually operable, switch 52 to an inhibiting input of AND circuit 34. The output of AND circuit 34 is coupled to the index input of a binary counter 60 providing the outputs 1, 2, 4, and 8 which actuate respective gates 72a, 72b, 72c, and 72d. The four outputs of counter 60 are coupled to AND circuit 54. Thus a stop signal is generated when the count is fifteen. The negative terminal of a battery 71 is grounded. The positive terminal of battery 71 is connected through gates 72a through 72d to one terminal of respective resistors 73a, 73b, 73c and 73d having respective values of 1, 2, 4, and 8 kilohms. The other terminals of resistors 73a through 73d are connected to the input of a high-gain, stabilized, direct-current amplifier 76 which is provided with a feed-back resistor 76a. In FIGURE 2, I have shown electrostatic beam deflection. Accordingly, the output of amplifier 76 is connected to one deflection plate 78a of tube 10 and to one deflection plate 79a of the tube 12. To balance the deflection plate voltages to ground and to prevent defocusing of the spot of tube 12 or the beam of tube 10, I provide a center-tapped resistor 76c and a high-gain direct-current amplifier 76b. The center tap of resistor 76c is connected to the input of amplifier 76b. The output of amplifier 76b is connected to one terminal of resistor 76c and to the other deflection plate 78b of tube 10 and to the other deflection plate 79b of tube 12. The output of amplifier 76 is connected to the other terminal of resistor 76c.

It will be seen that the 1 output of counter 60 controls the most significant analogue current flow through the 1K resistor 73a and that the most significant 8 output of counter 60 controls the least significant analogue current flow through the 8K resistor 73d. There is a complete reversal in the order of significance between the outputs of counter 60 and the inputs of the digital-to-analogue converter.

Table I shows the consecutive decimal count, the consecutive binary output of counter 60, the reversed binary output of the digital-to-analogue converter, and the resultant decimal sequence generated.

TABLE I

| Decimal Count | Straight Binary | Reversed Binary | Decimal Sequence |
| --- | --- | --- | --- |
| 0 | 0000 | 0000 | 0 |
| 1 | 0001 | 1000 | 8 |
| 2 | 0010 | 0100 | 4 |
| 3 | 0011 | 1100 | 12 |
| 4 | 0100 | 0010 | 2 |
| 5 | 0101 | 1010 | 10 |
| 6 | 0110 | 0110 | 6 |
| 7 | 0111 | 1110 | 14 |
| 8 | 1000 | 0001 | 1 |
| 9 | 1001 | 1001 | 9 |
| 10 | 1010 | 0101 | 5 |
| 11 | 1011 | 1101 | 13 |
| 12 | 1100 | 0011 | 3 |
| 13 | 1101 | 1011 | 11 |
| 14 | 1110 | 0111 | 7 |
| 15 | 1111 | 1111 | 15 |

Referring now to FIGURE 3, I have shown a simplified 1-dimensional form of ternary sequence generator. AND circuit 34 is again driven by pulse generator 32. The stop signal from AND circuit 54 is again coupled through the normally closed, manually operable switch 52 to the inhibiting input of AND circuit 34. The output of AND circuit 34 is coupled to the indexing input of a three-stage ring counter 62a which provides the outputs 0, 1, and 2. The 0 output of ring counter 62a is coupled to the indexing input of a second ring counter 62b, which likewise provides the outputs 0, 1, and 2. The 0 output of counter 62b is coupled to the indexing input of yet a third three-stage ring counter 62c. The 0 outputs of counters 62a through 62c are coupled to AND circuit 54. Thus a stop signal is generated when the count is zero. The 1 outputs of counters 62a through 62c are coupled forwardly through crystals 64a, 64b, and 64c to the control inputs of gates 72a, 72b, and 72c, respectively. The 2 outputs of counters 62a through 62c are connected to the respective control inputs of gates 74a, 74b, and 74c. The 2 outputs of counters 62a through 62c are further coupled forwardly through crystals 66a, 66b, and 66c to the control inputs of gates 72a through 72c respectively. The negative terminal of battery 71 is again grounded. The positive terminal of battery 71 is connected through gates 72a through 72c to one terminal of resistors 73a, 73b, and 73c having the values 1, 3, and 9 kilohms, respectively. The positive terminal of battery 71 is further coupled through gates 74a through 74c to one terminal of resistors 75a, 75b, and 75c, having the values 1, 3, and 9 kilohms, respectively. The other terminals of resistors 73a through 73c and 75a through 75c are coupled to the input of a high-gain, stabilized, direct-current amplifier which is provided with a series feed-back circuit comprising a magnetic deflection winding 78 associated with electron beam tube 10 and magnetic deflection winding 79 associated with cathode ray tube 12.

It will be seen that the least significant ternary digit from counter 62a controls the most significant analogue currents through the 1K resistors 73a and 75a and that the most significant ternary digit from counter 62c controls the least significant analogue currents through the 9K resistors 73c and 75c. Thus as in FIGURE 2 there is a complete reversal in the order of significance between the outputs of counters 62a through 62c and the inputs to the digital-to-analogue converter.

Table II shows the consecutive decimal count, the consecutive ternary output from counters 62a through 62c, the reversed ternary output of the digital-to-analogue converter, and the resultant decimal sequence generated.

TABLE II

| Decimal Count | Straight Ternary | Reversed Ternary | Decimal Sequence |
| --- | --- | --- | --- |
| 0 | 000 | 000 | 0 |
| 1 | 001 | 100 | 9 |
| 2 | 002 | 200 | 18 |
| 3 | 010 | 010 | 3 |
| 4 | 011 | 110 | 12 |
| 5 | 012 | 210 | 21 |
| 6 | 020 | 020 | 6 |
| 7 | 021 | 120 | 15 |
| 8 | 022 | 220 | 24 |
| 9 | 100 | 001 | 1 |
| 10 | 101 | 101 | 10 |
| 11 | 102 | 201 | 19 |
| 12 | 110 | 011 | 4 |
| 13 | 111 | 111 | 13 |
| 14 | 112 | 211 | 22 |
| 15 | 120 | 021 | 7 |
| 16 | 121 | 121 | 16 |
| 17 | 122 | 221 | 25 |
| 18 | 200 | 002 | 2 |
| 19 | 201 | 102 | 11 |
| 20 | 202 | 202 | 20 |
| 21 | 210 | 012 | 5 |
| 22 | 211 | 112 | 14 |
| 23 | 212 | 212 | 23 |
| 24 | 220 | 022 | 8 |
| 25 | 221 | 122 | 17 |
| 26 | 222 | 222 | 26 |

FIGURE 4 is a diagrammatic view of the sequence generator shown in FIGURE 2. The binary counter 60 is indexed by a series of pulses from terminal 35 and provides the outputs 1, 2, 4, and 8. A binary digital-to-analogue converter 70 is provided with digital inputs having the significances 1, 2, 4, and 8, and generates an analogue output at terminal 77. The 1, 2, 4 and 8 outputs of counter 60 are coupled respectively to the 8, 4, 2, and 1 inputs of converter 70.

FIGURE 4A shows the resultant analogue sequence at terminal 77. It will be noted that this sequence is the same as shown in Table I, only because the space and time values are reciprocal. The following portions of the sequence have a separation in space of 1 and a separation in time of 4 so that the product of space separation and time separation is also 4: 8, 4 and 10, 6 and 9, 5 and 11, 7. The following portions of the sequence have a separation in space of 2 and a separation in time of 2 so that the product of space separation and time separation is again 4: 4, 12, 2 and 12, 2, 10 and 5, 13, 3 and 13, 3, 11. The following portions of the sequence have a separation in space of 4 and a separation in time of 1 so that the product of space separation and time separation is again 4: 2, 10, 6, 14, 1 and 10, 6, 14, 1, 9 and 6, 14, 1, 9, 5 and 14, 1, 9, 5, 13. The sequence contains the numbers 0 through 15 and thus contains 16 counts. It will be seen then that the minimum space-time separation product is $4/16 = \frac{1}{4}$ the maximum count. It will also be noted that for other portions of the sequence the space-time separation product is greater than ¼ the maximum count.

Referring now to FIGURE 5 I have shown a diagrammatic view of the sequence generator shown in FIGURE 3. The ternary counter 60, supplied with indexing pulses from terminal 35, provides the pairs of ternary outputs 1, 3, and 9. The digital-to-analogue converter 70, having the pair of ternary inputs 1, 3, and 9, provides an analogue output at terminal 77. The two 1 outputs of counter 60 are coupled to the two 9 inputs of converter 70; the two 3 outputs of counter 60 are coupled to the two 3 inputs of converter 70; and the two 9 outputs of counter 60 are connected to the two 1 inputs of converter 70.

FIGURE 5A shows the resulting analogue sequence provided at terminal 77 which is the same as shown in Table II, only because the space and time values are reciprocal. It will be noted that the portion of the sequence proceeding 0, 9 has a space separation of 1 and a time separation of 9 yielding a space-time separation product of 9. The portion of the sequence proceeding 0, 9, 18, 3 has a space separation of 3 and a time separation of 3 yielding a space-time separation product of 9. The portion of the sequence proceeding 0, 9, 18, 3, 12, 21, 6, 15, 24, 1 has a space separation of 9 and a time separation of 1 again yielding a space-time separation product of 9. Thus for a ternary 1-dimensional sequence generator the minimum space-time separation product is $9/27 = 1/3$ the maximum count. Of course other portions of the sequence have a greater space-time separation product.

Referring now to FIGURE 6, I have shown a diagrammatic view of a 1-dimensional quaternary sequence generator. I again provide a binary counter 60 and a binary digital-to-analogue converter 70. The sequence generator, however, operates in the quaternary system by virtue of the connections of pairs of binary digits. The 1 output of counter 60 is coupled to the 4 input of converter 70. The 2 output of counter 60 is coupled to the 8 input of converter 70. The 4 output of counter 60 is coupled to the 1 input of converter 70. The 8 output of counter 60 is coupled to the 2 input of converter 70.

FIGURE 6A shows the resultant analogue sequence provided at terminal 77. It will be seen that the portion of the sequence proceeding 0, 4 has a space-time product of 4. The portion of the sequence proceeding 0, 4, 8, 12, 1 also has a space-time product of 4. Thus the minimum space-time separation product is $4/16 = 1/4$ the maximum count of 16.

It will be seen then that the 1-dimensional binary and quaternary sequence generators have the same minimum space-time separation product which is $1/4$ the maximum count. However, the 1-dimensional ternary sequence generator has a minimum space-time separation product of $1/3$ the maximum count. Accordingly, for 1-dimensional sequence generators the ternary system offers a slight advantage in that it produces a higher minimum space-time separation product.

FIGURE 7 is a diagrammatic view of a 1-dimensional nonary sequence generator. While counter 60 and converter 70 have ternary inputs and outputs, a nonary system generator is achieved by the grouping of pairs of ternary digits. The pair of 1 outputs of counter 60 are coupled to the pair of 9 inputs of converter 70. The pair of 3 outputs of counter 60 are coupled to the pair of 27 inputs of converter 70. The pair of 9 outputs of counter 60 are coupled to the pair of 1 inputs of converter 70. The pair of 27 outputs of counter 60 are coupled to the pair of 3 inputs of converter 70.

FIGURE 7A shows the analogue sequence generated at terminal 77. It will be noted that the minimum space-time separation product is 9 which is $9/81 = 1/9$ the maximum count.

Referring now to FIGURE 8, there is shown a minimal 1-dimensional binary sequence generator. The 1 output of counter 60 is coupled to the 8 input of converter 70; and the 8, 4, and 2 outputs of counter 60 are connected respectively to the 4, 2, and 1 inputs of converter 70.

FIGURE 8A shows the resulting sequence generated. It will be noted that the minimum time-space separation product is 2.

Referring now to FIGURE 9, there is shown a minimal 1-dimensional ternary sequence generator. The pair of 1 outputs of counter 60 are connected to the pair of 9 outputs of converter 70; and the pairs of 9 and 3 outputs of counter 60 are connected to the pairs of 3 and 1 inputs, respectively, of converter 70.

FIGURE 9A shows the resulting sequence generated. It will be noted that the minimum space-time separation product is 3.

Referring now to FIGURE 10, there is shown a diagrammatic view of a 2-dimensional binary sequence generator. A first binary digital-to-analogue converter 70a provides an X analogue output at terminal 77a; and a second binary digital-to-analogue converter 70b provides a Y analogue output at terminal 77b. The 1, 4, and 16 outputs of counter 60 are connected respectively to the 4, 2, and 1 inputs of converter 70a. The 2, 8, and 32 outputs of counter 60 are connected respectively to the 4, 2, and 1 inputs of converter 70b.

FIGURE 10A shows the resulting 2-dimensional sequence generated. The (X, Y) coordinates of the sequence generated proceed as follows: $0 = (0, 0)$, $1 = (4, 0)$, $2 = (0, 4)$, $3 = (4, 4)$, $4 = (2, 0)$, $5 = (6, 0) \ldots 8 = (0, 2) \ldots 12 = (2, 2) \ldots 16 = (1, 0) \ldots 32 = (0, 1) \ldots 48 = (1, 1) \ldots 63 = (7, 7)$.

FIGURE 11 shows a 2-dimensional quaternary sequence generator. The 1 and 2 outputs of counter 60 are connected respectively to the 2 and 4 inputs of converter 70a. The 4 and 8 outputs of counter 60 are connected respectively to the 2 and 4 inputs of converter 70b. The 16 output of counter 60 is connected to the 1 input of converter 70a; the 32 output of counter 60 is connected to the 1 input of converter 70b.

FIGURE 11A shows the resulting 2-dimensional sequence generated which proceeds in (X, Y) coordinates as follows: $0 = (0, 0)$, $1 = (2, 0)$, $2 = (4, 0)$, $3 = (6, 0)$, $4 = (0, 2)$, $5 = (2, 2) \ldots 8 = (0, 4) \ldots 12 = (0, 6) \ldots 16 = (1, 0) \ldots 32 = (0, 1) \ldots 48 = (1, 1) \ldots 63 = (7, 7)$.

FIGURE 12 shows a 2-dimensional ternary sequence generator. The pair of 1 outputs of counter 60 are coupled to the pair of 3 inputs of converter 70a; the pair of 3 outputs of counter 60 are connected to the pair of 3 inputs of converter 70b; the pair of 9 outputs of counter 60 are connected to the pair of 1 inputs of converter 70a; the pair of 27 outputs of counter 60 are connected to the pair of 1 inputs of converter 70b.

FIGURE 12A shows the resulting 2-dimensional sequence generated which proceeds: $0 = (0, 0)$, $1 = (3, 0)$, $2 = (6, 0)$, $3 = (0, 3)$, $4 = (3, 3) \ldots 6 = (0, 6) \ldots 9 = (1, 0) \ldots 18 = (2, 0) \ldots 27 = (0, 1) \ldots 36 = (1, 1) \ldots 54 = (0, 2) \ldots 80 = (8, 8)$.

Comparing FIGURES 10A, 11A, and 12A it will be seen that the greatest minimum space-time separation product for a 2-dimensional sequence generator is achieved by the binary sequence generator of FIGURE 10.

In FIGURE 10A the portions of the sequence proceeding: 0, 1 and 2, 3 and 4, 5 have a space separation of 4 and a time separation of 1 yielding a space-time separation product of 4. Thus, the minimum space-time separation is $4/64 = 1/16$ the maximum count.

In FIGURE 11A the portions of the sequence proceeding 0, 1 and 1, 2 and 2, 3 and 4, 5 have a space separation of 2 and a time separation of 1, yielding a minimum space-time separation product of 2. This represents $2/64 = 1/32$ the maximum count.

In FIGURE 12A the portions of the sequence proceeding 0, 1 and 1, 2 and 3, 4 have a space separation of 3 and a time separation of 1, yielding a minimum space-time separation product of 3. This is $3/81 = 1/27$ the maximum count.

It will be recalled in conjunction with FIGURES 3 and 5 that a ternary sequence generator produces the greatest minimum space-time separation product for a 1-dimensional embodiment. However, for a 2-dimensional or N-dimensional embodiment, a binary sequence generator is preferable since it yields the greatest minimum space-time separation product.

Referring now to FIGURE 13, there is shown a 2-dimensional binary sequence generator which treats an area on a line-by-line basis. The 1, 2, and 4 outputs of counter 60 are connected respectively to the 4, 1, and 2 inputs of the X converter. The 8, 16, and 32 outputs of counter 60 are connected respectively to the 1, 2, and 4 inputs of the Y converter.

FIGURE 13A shows the resulting 2-dimensional sequence generated which has a minimum space-time separation product of 2 and proceeds as follows: 0=(0, 0), 1=(4, 0), 2=(1, 0), 3=(5, 0), 4=(2, 0), 5=(6, 0), 6=(3, 0), 7=(7, 0), 8=(0, 1,) 9=(4, 1) . . . 16= (0, 2) . . . 24=(0, 3) . . . 32=(0, 4) . . . 40=(0, 5) . . . 48=(0, 6) . . . 56=(0, 7) . . . 63=(7, 7).

FIGURE 14 shows a 2-dimensional binary sequence generator which provides line-by-line treatment of sub-areas. The 1, 4, and 8 outputs of counter 60 are connected respectively to the 4, 1 and 2 inputs of the X converter. The 2, 16, and 32 outputs of counter 60 are connected respectively to the 4, 1, and 2 inputs of the Y converter.

FIGURE 14A shows the resulting 2-dimensional sequence generated which has a minimum space-time separation product of 4 and proceeds as follows: 0=(0, 0), 1=(4, 0), 2=(0, 4), 3=(4, 4) 4=(1, 0), 5=(5, 0) . . . 8=(2, 0) . . . 12=(3, 0) . . . 16=(0, 1) . . . 20=(1, 1) . . . 32=(0, 2) . . . 48=(0, 3) . . . 63= 7, 7).

The 2-dimensional binary sequence generator of FIGURE 15 provides sub-area treatment of an entire area. The 1, 4, and 16 outputs of counter 60 are connected respectively to the 2, 1 and 4 inputs of the X converter. The 2, 8 and 32 outputs of counter 60 are connected respectively to the 2, 1 and 4 inputs of the Y converter.

FIGURE 15A shows the resulting 2-dimensional sequence generated which has a minimum space time separation product of 2 and proceeds as follows: 0=(0, 0), 1=(2, 0), 2=(0, 2), 3=(2, 2), 4=(1, 0), 5=(3, 0) . . . 8=(0, 1) . . . 12=(1, 1) . . . 15=(3, 3), 16= 4, 0) . . . 32=(0, 4) . . . 48=(4, 4) . . . 63=(7, 7).

FIGURE 16 shows a 3-dimensional binary sequence generator. The 1, 8, and 64 outputs of counter 60 are connected respectively to the 4, 2, and 1 inputs of the X converter which provides an analogue output at terminal 77a. The 2, 16 and 128 outputs of counter 60 are connected respectively to the 4, 2, and 1 inputs of the Y converter which provides an analogue output at terminal 77b. The 4, 32, and 256 outputs of counter 60 are connected respectively to the 4, 2, and 1 inputs of the Z converter which provides an analogue output at terminal 77c.

FIGRE 17 shows a 4-dimensional sequence generator. The 4 and 32 outputs of counter 60 are connected respectively to the 2 and 1 inputs of the X converter. The 8 and 64 outputs of counter 60 are connected respectively to the 2 and 1 inputs of the Y converter. The 16 and 128 outputs of counter 60 are connected respectively to the 2 and 1 inputs of the Z converter. The 1 and 2 outputs of counter 60 are coupled to a circuit 77d which selectively provides one of four possible W outputs representing a fourth dimension. The sequence generator of FIGURE 17 is adapted to treat a plurality of discrete volumes. Generally, the performance of an operation upon one volume will have negligible effect on any of the other volumes. Accordingly, the minimum space-time separation product can be increased by causing the least significant digit outputs of the counter to control the particular volume which is treated. Similarly, where a 3-dimensional sequence generator operates upon a plurality of discrete areas, and where a 2-dimensional sequence generator operates upon a plurality of discrete lengths, the minimum space-time separation product can be increased by causing the least significant counter outputs to select the particular one of the plurality to be operated upon.

In each of the sequence generators considered thus far, whether 1, 2, 3, 4, or N-dimensional and whether binary, ternary, quaternary, or nonary, the order of the individual counter and converter digits themselves has proceeded in an unmixed sequence, such as 0, 1 or 0, 1, 2, or 0, 1, 2, 3 or 1, 2, 3, 4, 5, 6, 7, 8. For each of these digit sequences the digit separation product is 1. The only possible mixed digit sequence for a binary generator is a simple reversal of order so that the digit sequence proceeds 1, 0 instead of 0, 1. For a ternary generator the digit sequence may be mixed in a variety of ways; but it will be appreciated that the digit separation product for all ternary digit sequences, whether mixed or unmixed, is 1.

Yet each of the sequence generators shown actually employs mixed sequence digits when we consider that a plurality of individual counter and converter digits forms an individual digit in some higher-ordered number system. For example, FIGURES 3 and 5 may be considered as nonary generators employing a mixed digit sequence proceeding 0, 3, 6, 1, 4, 7, 2, 5, 8 and having a digit separation product of 3. Also, FIGURES 2 and 4 may be considered as quaternary generators employing mixed digit sequences which proceed 0, 2, 1, 3. However, it will be noted that this particular mixed quaternary digit sequence still has a separation product of 1. FIGURES 2 and 4 may further be considered as octal generators employing mixed digit sequences proceeding 0, 4, 2, 6, 1, 5, 3, 7 and having a digit separation product of 2. Furthermore FIGURE 13 may be considered as a 2-dimensional octal generator having the mixed octal digit sequence shown in FIGURE 13A.

Referring now to FIGURE 18, there is shown a 1-dimensional binary sequence generator having one digit of reversed order. The 1, 2, and 4 outputs of counter 60 are connected respectively to the 4, 8, and 2 inputs of converter 70. The 8 output of counter 60 is connected to inhibit the 1 input of converter 70 and thus reverses the normal binary digit order.

FIGURE 18A shows the resulting 1-dimensional sequence generated. It will be noted that the portions of the sequence proceeding 8, 0, 12, 4, and 9, 1, 13, 5 and 10, 2, 14, 6 and 11, 3, 15, 7 considered as isolated groups have a minimum space-time separation product of 8. However, the groups are adjacent and portions of the sequence do proceed 4, 9 and 5, 10 and 6, 11 so that the minimum space-time separation product of the sequence is 5. This represents $5/16$ the maximum count, a value slightly greater than $1/4$ which has heretofore been associated with binary and quaternary 1-dimensional sequence generators. However, it will be noted that the space-time product of $5/16$ for FIGURE 18 is still slightly less than the space-time product of $1/3$ for the ternary sequence generators of FIGURES 3 and 5.

Referring now to FIGURE 19, there is shown a minimal 1-dimensional reversed digit binary sequence generator. The 2, 4, and 8 outputs of counter 60 are respectively to the 1, 4, and 8 inputs of converter 70. The 1 output of counter 60 is coupled to inhibit the 2 input of converter 70 and thus reverses the normal binary digit order.

FIGURE 19A shows the resulting 1-dimensional sequence generated. It will be noted that the treatment is on a fractional line basis. The sequence contains four groups each proceeding in the order 1, 3, 0, 2 and the sequence itself has a minimum space-time separation product of 2. FIGURE 19 may thus be considered not only as a reversed digit binary sequence generator but also as a quaternary generator having the mixed digit sequence 1, 3, 0, 2 which has a digit separation product of 2.

Referring now to FIGURE 20, there is shown a 2-dimensional mixed quintary, reversed-binary sequence generator. Counter 60 provides a maximum count of 400 and comprises a first 5-stage ring counter which indexes a second 5-stage ring counter which in turn indexes a 4-bit binary counter. The 0, 1, 2, 3, and 4 outputs of the first 5-stage ring counter are connected respectively to the 4, 12, 0, 8 and 16 inputs of the X converter 70a. The 0, 5, 10, 15, and 20 outputs of the second 5-stage ring counter are connected respectively to the 4, 12, 0, 8, and 16 inputs of the Y converter 70b. The 25 and 50 binary outputs of counter 60 are connected to the 2 inputs of converters 70a and 70b respectively. The 100 and 200 binary outputs are coupled to inhibit the 1 inputs of converters 70a and 70b respectively.

FIGURE 20A shows the resulting 2-dimensional sequence generated which in (X, Y) coordinates proceeds: 0=(5, 5), 1=(13, 5), 2=(1, 5), 3=(9, 5), 4=(17, 5), 5=(5, 13), 6=(13, 13) ... 10=(5, 1) ... 15=(5, 9) ... 20=(5, 17) ... 25=(7, 5) ... 50=(5, 7) ... 75=(7, 7) ... 100=(4, 5) ... 200=(5, 4) ... 300=(4, 4) ... 399=(18, 18). The minimum space-time separation product is $8/400=1/50$ the maximum count.

It will be seen that there are three aspects to my invention for providing a sequence having a space-time product greater than unity.

Firstly, for sequence generators employing either binary or ternary digits or a combination of binary and ternary digits, where no reversed order binary digit or mixed order ternary digit can have a digit separation product greater than unity, then I may provide a sequence having a space-time separation product greater than unity by mixing the places of significance of the various digits. I have pointed out that groups of digits having mixed significances may be considered as a single mixed sequence digit in some higher ordered number system.

Secondly, I may provide a sequence generator having a space-time separation product greater than unity by employing a quaternary or higher ordered digit system (whether or not produced by a plurality of lower ordered digits having mixed places of significance) having a mixed digit order with a digit separation product greater than unity. Thus the first and second aspects of my invention are interrelated.

Thirdly, for 2-dimensional and other N-dimensional sequence generators operating upon a plurality of discrete and isolated lengths, areas, or volumes, a space-time separation product greater than unity is readily obtained by causing the least significant counter output or outputs to control the selection of a particular one of the discrete and isolated elements to be treated or operated upon. The least significant counter output or outputs should provide a number system equal to the number of isolated elements. For 2-dimensional and other N-dimensional sequence generators operating upon a single area or volume, the space-time separation product is increased by mixing the dimensional axes so that successive digits operate on successively different axes. Here it is desirable that the lowest ordered number system be employed, which is the binary system, to increase the degree of mixing of dimensional axes. However where a 2-dimensional or N-dimensional sequence generator operates upon a single anisotropic area or volume (as in a grain oriented material where cross-grain heat flow is less than heat flow parallel to the grain), then it is better to consider the material as composed of at least partially isolated elements. In such case the least significant counter output or outputs should control that axis affording the partial isolation (as the cross-grain axis); and it is preferable that a ternary or higher order number system be employed for such axis of partial isolation.

It will be seen that I have accomplished the objects of my invention. My space-time sequence generator provides a product of space separation and time separation which is greater than unity so that points successive in time are not adjacent in space and points adjacent in space are not successive in time. I have provided a sequence generator having the greatest minimum space-time separation product which treats the space to be operated upon as an entity and reduces the localized effects of a plurality of successive operations. I have provided a novel method of and apparatus for electron beam machining. I may further employ the phototube output to control beam duration automatically and provide variable relief machining where a photographic negative is used having gradations of shading. While my invention is especially useful in electron beam machining, it is not limited to such application.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not limited to the specific details shown and described.

Having thus described my invention what I claim is:

1. An electron beam machining system including in combination a first electron beam machining tube having a deflection input and an intensity input, a second electron beam tube having a deflection input, a pulse generator, a first and a second gate, means coupling the pulse generator to the first gate, means responsive to the first gate for synchronously controlling the deflection input of both tubes, means responsive to the second tube for applying a signal to the second gate, means responsive to the first gate for enabling the second gate, and means responsive to the second gate for disabling the first gate and for controlling the intensity input of the first tube.

2. An electron beam machining system as in claim 1 in which the means for controlling the deflection inputs includes a digital sequence generator providing a minimum space-time separation product greater than unity.

3. An electron beam machining system as in claim 1 in which the means for enabling the second gate includes a delay network.

4. An electron beam machining system as in claim 1 in which the means responsive to the second gate includes a second generator providing a pulse of predetermined amplitude-time integral.

5. An electron beam machining system as in claim 1 in which the means responsive to the second gate includes a second pulse generator, the system further including means responsive to the second tube for controlling the amplitude-time integral of pulses provided by the second generator.

6. An electron beam machining system including in combination a first electron beam machining tube having a deflection input and an intensity input, a second electron beam tube having a deflection input, a clock source, a counter having an input and providing a plurality of digit outputs of successive significances, a digital-to-analog converter providing an output and having a plurality of digit inputs of successive significances, means coupling the clock source to the counter input, means coupling the digit outputs of the counter to the digit inputs of the converter in reverse order of significance, means coupling he converter output to the deflection input of both tubes, and means responsive to the second tube for controlling the intensity input of the first tube and for decoupling the clock source from the counter input.

7. An electron beam machining system including in combination a first electron beam machining tube having a deflection input and an intensity input, a second electron beam tube having a deflection input, a clock source, a counter having an input and providing a least significant digit output and a more significant digit output, a digital-to-analog converter providing an output and having a least significant digit input and a more significant digit input, means coupling the clock source to the counter input, means coupling the least significant digit output to the more significant digit input, means coupling the more significant digit output to the least significant digit input, means coupling the converter output to the deflection input of both tubes, and means responsive to the second tube for controlling the intensity input of the first tube and for decoupling the clock source from the counter input.

8. An electron beam machining system including in combination a first electron beam machining tube having a deflection input and an intensity input, a second electron beam tube having a deflection input, a clock source, a counter having an input and providing a plurality of output bits representing a least significant output digit, a digital-to-analog converter providing an output and having a plurality of corresponding input bits representing an input digit of predetermined significance, means coupling the clock source to the counter input, means coupling at least two of the output bits to non-corresponding input bits, means coupling the converter output to the deflection input of both tubes, and means responsive to the second tube for controlling the intensity input of the first tube and for decoupling the clock source from the counter input.

9. An electron beam machining system including in combination a first electron beam machining tube having a deflection input and an intensity input, a second electron beam tube having a deflection input, a clock source, means for generating a step-wise variable signal, means coupling the clock source to the generating means, means coupling the signal to the deflection input of both tubes, and means responsive to the second tube for controlling the intensity input of the first tube and for decoupling the clock source from the generating means.

10. A system as in claim 9 which further includes means responsive to the second tube for controlling the time interval during which the clock source and generating means are decoupled.

11. An electron beam machining system including in combination a first electron beam machining tube having a deflection input and an intensity input, a second electron beam tube having a deflection input, a clock source, a gate, means coupling the clock source to the gate, means responsive to the gate for synchronously controlling the deflection input of both tubes, and means responsive to the second tube for controlling the intensity input of the first tube and for disabling the gate.

12. A system as in claim 11 in which the means for controlling the deflection inputs includes a digital sequence generator providing a minimum space-time separation product greater than unity.

13. An electron beam machining system including in combination a first electron beam machining tube having a deflection input and an intensity input, a second electron beam tube having a deflection input, a clock source, means coupling the clock source to the deflection input of both tubes, and means responsive to the second tube and to the clock source for controlling the intensity input of the first tube and for decoupling the clock source from the deflection inputs.

14. An electron beam machining system including in combination a first electron beam machining tube having a deflection circuit and an intensity input, a second electron beam tube having a deflection circuit, a clock source, means coupling the clock source to the deflection circuit of both tubes, a gate, means responsive to the second tube for coupling a signal to the gate, means responsive to the clock source for enabling the gate, and means responsive to the gate for controlling the intensity input of the first tube and for decoupling the clock source from the deflection circuits.

15. A system as in claim 14 in which the clock source has a predetermined period and in which the enabling means includes a network providing a time delay which is an appreciable portion of the period.

16. A system as in claim 14 in which the deflection circuit of the first tube has a certain time-constant, in which the deflection circuit of the second tube has a predetermined time-constant, and in which the clock source has a period which is many times greater than either of said time-constants.

17. A system as in claim 14 in which the clock source has a certain period and in which the means responsive to the gate includes a generator providing a pulse having a duration which exceeds the period.

18. A system as in claim 14 in which the clock source has a certain period, in which the enabling means includes a network providing a time delay which is an appreciable portion of the period, and in which the means responsive to the gate includes a generator providing a pulse of such duration that the sum of the duration and the delay exceeds the period.

19. An electron beam machining system including in combination a first electron beam machining tube having a deflection circuit and an intensity input, a second electron beam tube having a deflection circuit, a clock source, means for generating a step-wise variable signal, means coupling the clock source to the generating means, means coupling the signal to the deflection circuit of both tubes, a gate, means responsive to the second tube for coupling a signal to the gate, means including a delay network responsive to the clock source for enabling the gate, and means responsive to the gate for controlling the intensity input of the first tube.

20. A system as in claim 19 in which the clock source has a certain period and in which the network provides a time delay which is less than the period.

21. A system as in claim 19 in which the deflection circuit of the first tube has a certain time-constant, in which the deflection circuit of the second tube has a predetermined time-constant, and in which the clock source has a period which is many times greater than either of said time-constants.

22. A system as in claim 19 in which the deflection circuit of the first tube has a certain time-constant, in which the deflection circuit of the second tube has a predetermined time-constant, and in which the network provides a time delay which is many times greater than either of said time-constants.

23. An electron beam machining system including in combination a first electron beam machining tube having a deflection input and an intensity input, a second electron beam tube having a deflection input, means for providing a time-varying deflection signal, means coupling said deflection signal to the deflection input of both tubes, generating means for providing a pulse having a certain time duration, means comprising means responsive to the second tube for actuating the pulse generating means, means responsive to the generating means for controlling the intensity input of the first tube, and means responsive to the generating means for maintaining the deflection signal constant throughout the time duration of the pulse.

24. A system as in claim 23 which further includes means responsive to the second tube for controlling the time duration of the pulse provided by the generating means.

References Cited by the Examiner

UNITED STATES PATENTS

| | | | |
|---|---|---|---|
| 2,479,880 | 8/1949 | Toulon | 178—7.5 |
| 2,624,798 | 1/1953 | Dinga | 178—6.7 |
| 2,929,868 | 3/1960 | Leiter | 178—6.8 |
| 2,938,193 | 5/1960 | Eckert | 340—168 |
| 2,963,544 | 12/1960 | Nieset | 178—6.8 |
| 2,989,614 | 6/1961 | Steigerwald | 219—50 |
| 3,051,901 | 8/1962 | Yaeger | 340—347 |
| 3,118,132 | 1/1964 | Horn | 340—168 |
| 3,192,318 | 6/1965 | Schleich et al. | 178—6.8 |

FOREIGN PATENTS

| | | |
|---|---|---|
| 594,653 | 9/1960 | Belgium. |
| 919,299 | 2/1963 | Great Britain. |

DAVID J. GALVIN, *Primary Examiner.*

R. DZIURGOT, R. SEGAL, *Assistant Examiners.*